United States Patent

Wenghoefer et al.

[11] 4,283,196
[45] Aug. 11, 1981

[54] PROCESS FOR COLORING FIBER MATERIALS WITH AZO DYESTUFF CONTAINING —$SO_2CH_2CH_2OSO_3H$ AND —$N(CH_2CH_2OSO_3H)_2$ GROUPS

[75] Inventors: Johann Wenghoefer, E. Greenwich; Dennis G. Messier, W. Greenwich; James E. Thompson, Coventry, all of R.I.

[73] Assignee: American Hoechst Corporation, Somerville, N.J.

[21] Appl. No.: 200,726

[22] Filed: Oct. 27, 1980

Related U.S. Application Data

[60] Division of Ser. No. 65,791, Aug. 13, 1979, Pat. No. 4,271,072, which is a continuation of Ser. No. 862,317, Dec. 20, 1977, abandoned.

[51] Int. Cl.$^3$ .................. D06P 3/82; C09B 62/00; C09B 29/01
[52] U.S. Cl. .......................... 8/531; 8/549; 8/681; 8/917; 8/918; 8/924; 260/207.3
[58] Field of Search ............ 8/531, 549, 918, 924, 8/917; 260/207.3

[56] References Cited
U.S. PATENT DOCUMENTS
3,531,459  9/1970  Chiddix et al. ............ 260/207.3

Primary Examiner—A. Lionel Clingman
Attorney, Agent, or Firm—Stephan P. Williams

[57] ABSTRACT pg.1 A process is disclosed for coloring fiber materials selected from cellulose, natural or synthetic polyamides, and mixtures thereof, which comprises applying to said fiber material a water soluble dyestuff which, in the form of the free acid, has the formula:

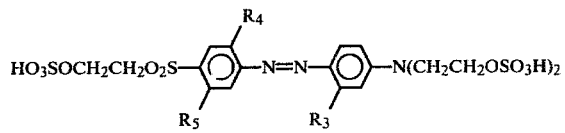

wherein $R_3$ is halogen and $R_4$ and $R_5$ are each independently selected from hydrogen, methyl, ethyl, methoxy and ethoxy, and fixing said dyestuff on said fiber material by the action of an alkaline agent and the optional additional application of heat or steam. The dyestuffs utilized are distinguished by outstanding fastness properties such as fastness to light, wet processing and acid.

5 Claims, No Drawings

PROCESS FOR COLORING FIBER MATERIALS WITH AZO DYESTUFF CONTAINING —SO₂CH₂CH₂OSO₃H AND —N(CH₂CH₂OSO₃H)₂ GROUPS

This application is a division of Ser. No. 065,791, filed Aug. 13, 1979, now U.S. Pat. No. 4,271,072, which is a continuation of Ser. No. 862,317, filed Dec. 20, 1977, now abandoned.

The present invention provides novel and valuable water-soluble dyestuffs having the formula (1) in the form of the free acid:

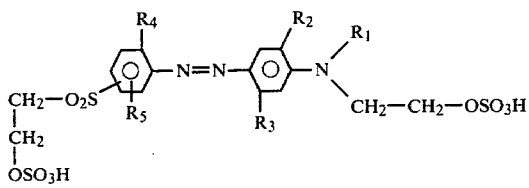

wherein $R_1$ is selected from the group consisting of H, alkyl having 1-4 carbon atoms, cyanoalkyl having 2-4 carbon atoms, hydroxy alkyl having 2-4 carbon atoms or a sulfuric acid ester of a hydroxy alkyl having 2-4 carbon atoms;

$R_2$ is selected from the group consisting of H, methyl, ethyl, methoxy or ethoxy;

$R_3$ is selected from the group consisting of H, halogen, methyl, ethyl, methoxy, ethoxy, or carbonamido having 1-4 carbon atoms;

$R_4$ is selected from the group consisting of H, methyl, ethyl, methoxy or ethoxy; and $R_5$ is selected from the group consisting of H, methyl, ethyl, methoxy or ethoxy.

The dyestuffs of the instant invention of formula (1) wherein the β-sulfatoethylsulfonyl group is present in the diazocomponent in para-position to the azo group are preferred, especially those dyestuffs which possess, in form of the free acid, the general formula (1a):

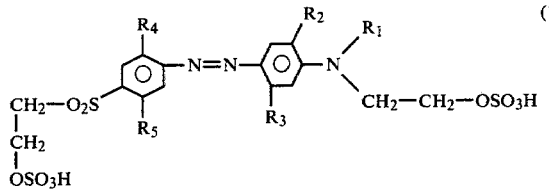

wherein $R_1$, $R_2$, $R_3$, $R_4$ and $R_5$ are defined as above.

Especially preferred and advantageous is the dyestufff having in form of the free acid the formula (1b):

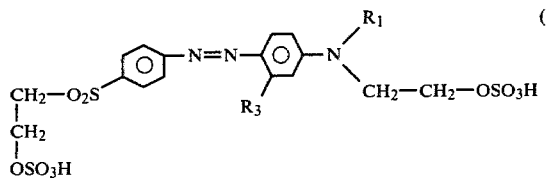

wherein:

$R_1$ is —CH₂CH₃ or —CH₂CH₂—OSO₃H; and $R_3$ is H or Cl.

The novel dyestuffs are preferably present in the form of their salts, especially alkali metal salts, for example sodium or potassium salts, or alkaline earth metal salts, for example calcium salts, and are used preferably in the form of the aforesaid salts.

The present invention also provides a process for the preparation of the dyestuffs of formula (1) or of their salts, which comprises diazotizing an aromatic amine of the formula (2):

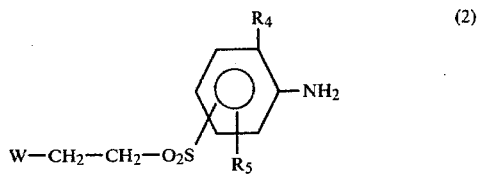

or a salt thereof, preferably an alkali metal or alkaline earth metal salt, in which $R_4$ and $R_5$ have the aforesaid meaning and W stands for the hydroxy or sulfato group, and coupling it with a coupling component of the formula (3):

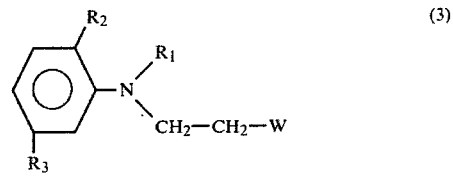

or a salt thereof, preferably an alkali metal or alkaline earth metal salt, in which $R_1$, $R_2$, $R_3$ and W have the aforesaid meaning. In the case of the preparation of a dyestuff of the formula (4):

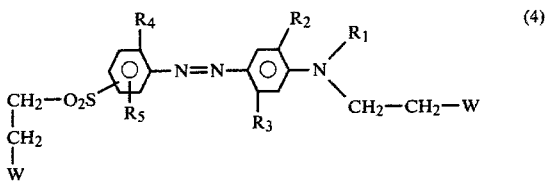

in which $R_1$, $R_2$, $R_3$, $R_4$ and $R_5$ have the aforesaid meaning and one or both radicals W represent hydroxy, this dyestuff of formula (4) is transformed into its sulfuric acid semi-ester compound of formula (1) or its salts by means of a sulfatization agent.

In all of the above formulas where $R_3$ is halogen, the preferred halogens are chlorine, bromine or fluorine, preferably chlorine.

The acid compounds of formula (1) are transformed into their salts or vice versa by methods known to those skilled in the art, such as by neutralization or acidification with a strong inorganic acid, for example sulfuric acid.

Suitable diazo components of formula (2) for preparing the dyestuffs of the invention are especially
4-β-sulfatoethylsulfonyl-aniline,
3-β-sulfatoethylsulfonyl-aniline,
2,4-dimethyl-5-β-sulfatoethylsulfonyl-aniline,
2-ethyl-4-β-sulfatoethylsulfonyl-aniline
2-ethoxy-5-β-sulfatoethylsulfonyl-aniline,
2-ethyl-5-β-sulfatoethylsulfonyl-aniline,
2,6-diethoxy-4-β-sulfatoethylsulfonyl-aniline,
2,6-dimethoxy-4-β-sulfatoethylsulfonyl-aniline,
2,5-diethyl-4-β-sulfatoethylsulfonyl-aniline, 2-methyl-5-β-sulfatoethylsulfonyl-aniline,
2-methoxy-5-β-sulfatoethylsulfonyl-aniline,
4-methoxy-5-β-sulfatoethylsulfonyl-aniline,
2-methyl-4-methoxy-5-β-sulfatoethylsulfonyl-aniline,
2,6-dimethyl-4-β-sulfatoethylsulfonyl-aniline,
2,6-dimethyl-3-β-sulfatoethylsulfonyl-aniline,
2,5-dimethyl-4-β-sulfatoethylsulfonyl-aniline,
2,5-dimethoxy-4-β-sulfatoethylsulfonyl-aniline,
2-methoxy-5-methyl-4-β-sulfatoethylsulfonyl-aniline,
or the β-hydroxyethylsulfonyl derivatives thereof.

The compounds of formula (2) containing a β-sulfatoethylsulfonyl group can be prepared from the corresponding β-hydroxyethylsulfonyl-anilines by esterification, for example with water-containing or concentrated sulfuric acid or with amidosulfonic acid, for example by adding the corresponding β-hydroxyethylsulfonyl anilines to an equimolecular amount of 60% sulfuric acid and subsequently heating in a manner analogous to the process described in German Pat. No. 1,150,163, or by dissolving the β-hydroxyethylsulfonyl anilines in an excess of concentrated sulfuric acid or 100% sulfuric acid (monohydrate) at room temperature (i.e. at about 10°-25° C.) or by reacting with amidosulfonic acid in the presence of pyridine or a pyridine base in a manner analogous to the esterification process described in U.S. Pat. No. 3,414,579. In the process of the invention the β-sulfatoethylsulfonyl anilines prepared in this manner can be used directly in the form of the reaction mixture obtained in the esterification, i.e. without isolation.

Suitable coupling components of formula (3) for preparing the dyestuffs of the invention are especially the following compounds:
N-β-sulfatoethyl-aniline, N-β-sulfatoethyl-N-ethyl-aniline,
N-β-sulfatoethyl-N-methyl-aniline, N-β-sulfatoethyl-6-methyl-aniline, N-β-sulfatoethyl-N-n-butyl-aniline,
N-β-sulfatoethyl-N-ethyl-3-methyl-aniline,
N-β-sulfatoethyl-N-ethyl-3-chloro-aniline, N-β-sulfatoethyl-N-β-hydroxyethyl-3-chloro-aniline, N,N-di-β-sulfatoethyl-aniline, N,N-di-β-sulfatoethyl-3-chloro-aniline, N-β-sulfatoethyl-N-β-carboxyethyl-aniline, N-β-sulfatoethyl-N-β-carbethoxyethyl-aniline, N-β-sulfatoethyl-N-β-cyanethyl-aniline, N-β-sulfatoethyl-N-β-cyanethyl-3-methyl-aniline, N-β-sulfatoethyl-N-β-hydroxyethyl-aniline, N,N-di-β-sulfatoethyl-3,6 dimethoxy-aniline, N,N-di-β-sulfatoethyl-3-methyl-aniline, N,N-di-β-sulfatoethyl-6-methoxy-aniline, N,N-di-β-sulfatoethyl-3-carbonamidoethyl-6-methoxy-aniline, N-β-sulfatoethyl-N-β-cyanethyl-3-carbonamidomethyl-6-methoxy-aniline or the β-hydroxyethyl derivatives thereof.

The coupling components of formula (3) containing a β-sulfatoethylamino group can be prepared, for example by the methods described by K. H. Saunders, J.Chem.Soc. (London) 121, 2667–2675 (1922). Alternatively, they can be obtained by esterification of their β-hydroxyethyl-aniline derivatives, for example by reacting same with sulfuric acid, for instance 100% sulfuric acid in the presence of chloro-sulfonic acid or with sulfuric acid containing sulfur trioxide (oleum). The coupling components of formula (3) esterified in this manner can also be used in the process of the invention directly in the form of the reaction mixture resulting from the esterification, i.e. in non-isolated form.

In the process of the invention the aromatic amines of formula (2) can be diazotized by generally known methods. In further processing reaction components carrying the group of the formula $-SO_2-CH_2-CH_2-OSO_3H$ should not be subjected to strong alkaline conditions. Compounds of this type as well as compounds carrying the β-hydroxyethylsulfonyl group are preferably coupled at a pH in the range of from 1 to 7 and at a temperature of from −5° to +25° C.

The dyestuffs of formula (1) prepared by the process of the invention can be isolated from the reaction solution by salting out with an electrolyte, for example sodium chloride or potassium chloride, advantageously after having adjusted the reaction mixture to a pH of from 3.5 to 7.0. They are then filtered off and dried. Alternatively, the dyestuffs of formula (1) obtained according to the invention can be isolated by concentration by evaporation or spray-drying. When the reaction solution contains large amounts of sulfate ions, it is recommended to precipitate same in the form of sparingly soluble salts prior to spray-drying, for example by the addition of calcium carbonate. It is also possible to use directly for dyeing the dyestuff solutions obtained after the synthesis, optionally after addition of buffer substances.

When the coupling is carried out with diazo and/or coupling components of formula (2) or (3) in which W represents hydroxy and the intermediate dyestuff of formula (4) is obtained, this dyestuff (4), which is only sparingly soluble in the aqueous medium in most cases, can be isolated directly by filtration, optionally after having adjusted a pH of from 3.5 to 7.0. If precipitation of this dyestuff is not complete, it can be completed by the addition of electrolyte. After drying, the isolated dyestuffs of formula (4) are transformed into the sulfuric acid semi-ester dyestuffs of formula (1). The esterification can be carried out in a manner analogous to the process of K. H. Saunders mentioned above, for example by reacting the compounds of formula (4) with highly concentrated sulfuric acid in excess, for example of 80 to 100% strength, or with chlorosulfonic acid in a non polar organic solvent. Other esterification methods suitable for transforming the dyestuffs of formula (4) into dyestuffs of formula (1) use amidosulfonic acid as sulfatization agent in the presence of pyridine or pyridine bases, or sulfur trioxide or chlorosulfonic acid in an aprotic polar organic solvent, for example N-methyl-pyrrolidone, dimethyl formamide or sulfolane (tetramethylenesulfone).

The dyestuffs of formula (1) obtained after the esterification can be isolated as follows:

When the esterification has been carried out in an excess of sulfuric acid, the esterification mixture is preferably diluted with ice, the excess sulfuric acid is precipitated by adding a calcium compound, for example calcium carbonate, the dyestuff solution is separated and the dyestuff is isolated from the filtrate obtained by salting out or spray-drying.

In the case of the esterification in a non-polar organic solvent immiscible with water with one of the aforesaid esterification agents, for example chlorosulfonic acid, water or ice are added, the mixture is optionally neutralized, the organic phase is separated and the dyestuff is isolated from the aqueous phase in the manner described above. With the esterification with amidosulfonic acid in pyridine or a pyridine base, the esterification mixture is first distilled in vacuo to recover the major proportion of the pyridine or pyridine base. Further amounts of the pyridine or pyridine base can then be separated in dilute form by adding water and effecting another distillation. When the esterification is carried out in a polar, aprotic, organic solvent immiscible with water using sulfur trioxide or chlorosulfonic acid, the dyestuff can be precipitated by adding methanol and filtered off with suction after neutralization with an alkaline agent, for example finely ground sodium carbonate, or the esterification mixture can be diluted with water, neutralized, the organic phase extracted with methylene chloride and the dyestuff isolated from its aqueous solution by spray-drying or salting out.

It is another object of the present invention to use the dyestuffs of formula (1) for dyeing and printing cellulose fibers and natural or synthetic polyamide fiber materials. Still another object of this invention is to provide a process for dyeing and printing cellulose fiber material and natural or synthetic polyamide fiber materials by applying a dyestuff of formula (1) on said fiber material and fixing it thereon. Cellulose fiber materials are preferably cotton and regenerated cellulose, for example viscose rayon, flax, hemp and jute. Suitable polyamide fiber materials are especially wool and hairs of other animals as well as silk. Preferred synthetic polyamides are especially polyamide 6,6, polyamide 6, polyamide 11 and polyamide 4.

The novel dyestuffs of formula (1) are especially suitable as reactive dyes, they can be fixed fast on the aforesaid substrata by the method known for reactive dyes. On cellulose fibers they yield by the exhaust process in a long bath with the use of various alkali additives dyeings of a very good dyestuff yield. Excellent color yields (tinctorial strengths) are also obtained by padding cellulose fibers by known padding processes wherein the dyestuff is fixed by means of an applied alkali while dwelling the so treated material at room temperature or by subsequent steaming or with dry heat. For printing, the usual One-Phase process is suitable wherein a printing paste containing an acid binding or alkali-yielding agent, for example sodium bicarbonate, sodium carbonate or sodium trichloroacetate, is applied on the material with subsequent fixation of the dyestuff by steaming, for example at 101° to 103° C. The Two-Phase processes are also suitable wherein a neutral or weakly acid printing paste is printed on the fiber material which is passed thereafter through a hot alkaline bath containing an electrolyte, or which is cross padded by an alkaline, electrolyte-containing padding liquor and the dyestuff is then fixed by steaming or under the action of dry heat. With these processes, intense prints with sharp outlines and a clear white background are obtained. The quality of the prints is not significantly influenced by varying fixation conditions and, therefore, the constency of the shades is satisfactory.

The dyeing and prints obtained with the dyestuffs of formula (1) on cellulose fiber materials are distinguished by outstanding fastness properties. In this connection the most important properties of manufacture and use should be stressed, especially fastness to light, fastness to wet processing such as washing at 60° and 95° C., fastness to acid and alkaline milling, fastness to water and sea water, fastness to acid cross-dyeing, fastness to alkaline and acid perspiration and fastness to pleating, hot pressing (ironing) and rubbing. Moreover, the dischargeability to white of the dyeings is very good.

Natural as well as synthetic polyamide fiber materials are preferably dyed with the novel dyestuffs of formula (1) in an acid, aqueous dye bath or liquor. The desired pH of the dye bath or liquor is preferably adjusted with acetic acid or acetic acid and ammonium or sodium acetate. To obtain dyeings having a good levelness or to improve the levelness of the dyeings, it proved advantageous to add the usual levelling agents, for example compounds based on a reaction product of a fatty amine, for example stearyl amine, with an alkylene oxide, such as ethylene oxide, and/or a reaction product of cyanuric chloride with approximately the three-fold molar amount of an aminobenzene-sulfonic acid and/or an aminonaphthalene-sulfonic acid. The material is dyed in usual manner at a temperature of from 60° to 100° C., preferably by the exhaust process, more especially at the boiling temperature of the dye bath or in a pressure dyeing machine at a temperature of from about 110° to 120° C.

The following examples illustrate the invention, the parts being by weight unless otherwise stated, and the relation of parts by weight to parts by volume being the same as that of the kilogram to the liter.

EXAMPLE 1

4-($\beta$-Hydroxethyl sulfone sulfuric acid ester)-aniline, 28.1 parts, is added to 200 parts of water. Mixture is acidified by the addition of 21.5 parts of 31.5% hydrochloric acid. Sufficient ice is added to reduce temperature to 0°–5° C. At this temperature, 20 parts of 5 N sodium nitrite solution is added during 15 minutes. The mixture is stirred for 15 minutes, and the excess nitrous acid decomposed by addition of a small amount of sulfamic acid. The diazonium salt suspension is added to a solution of coupling component obtained by dissolving 24.5 parts of N-($\beta$-hydroxyethyl sulfuric acid ester)-N-ethyl aniline in 200 parts of water. The pH of the mixture is adjusted to 6.0 by the addition of about 16 parts of sodium carbonate. The dyestuff is precipitated with potassium chloride, filtered with suction, dried, and ground. The yield is 80 parts by weight of a red-orange powder, which dissolves in water to give a red-orange solution. Bright red-orange shades are obtained from salt-containing dye liquors with the aid of alkalies on natural and regenerated cellulosic fibers.

The compound produced according to this example is of the structure designated in NO. 2 in Table 1.

EXAMPLE 2

4-($\beta$-Hydroxyethyl sulfone sulfuric acid ester)-aniline, 28.1 parts, is added to 200 parts of water. Mixture is acidified by the addition of 21.5 parts of 31.5% hydrochloric acid. Sufficient ice is added to reduce temperature to 0°–5° C. At this temperature, 20 parts of 5 N sodium nitrite solution is added during 15 minutes. The mixture is stirred for 15 minutes, and the excess nitrous acid decomposed by addition of a small amount of sulfamic acid. The diazonium salt suspension is added to a solution of coupling component obtained by dissolving 34.1 parts of N,N-di-($\beta$-hydroxyethyl sulfuric acid ester)-aniline in 200 parts of water. The pH of the mixture is adjusted to 6.0 by the addition of about 25 parts of sodium carbonate. The dyestuff is precipitated with potassium chloride, filtered with suction, dried and ground. The yield is 82.5 parts by weight of an orange powder, which dissolves in water to give an orange solution. Bright orange shades are obtained from salt-containing dye liquors with the aid of alkalies on natural and regenerated cellulosic fibers.

The compound produced according to this example is of the structure designated in NO. 4 in Table 1.

EXAMPLE 3

4-(β-Hydroxyethylsulfone sulfuric acid ester) aniline, 28.1 parts, is added to 200 parts of water. Mixture is acidified by the addition of 21.5 parts of 31.5% hydrochloric acid. Sufficient ice is added to reduce temperature to 0°–5° C. At this temperature, 20 parts of 5 N sodium nitrite solution is added during 15 minutes. The mixture is stirred for 15 minutes, and the excess nitrous acid decomposed by addition of a small amount of sulfamic acid. The diazonium salt suspension is added to a solution of coupling component obtained by dissolving 37.6 parts of N,N-di-(β-hydroxyethyl sulfuric acid ester)-3-chloroaniline in 200 parts of water. The pH of the mixture is adjusted to 6.0 by the addition of about 25 parts of sodium carbonate. The dyestuff is precipitated with potassium chloride, filtered with suction, dried and ground. The yield is 80 parts by weight of an orange powder, which dissolves in water to give an orange solution. Bright orange shades are obtained from salt-containing dye liquors with the aid of alkalies on natural and regenerated cellulosic fibers.

The compound produced according to this example is of the structure designated in NO. 9 in Table 1.

EXAMPLE 4

2-Methoxy-5-(β-hydroxyethylsulfone sulfuric acid ester)-aniline, 31.1 parts, is added to 200 parts of water. Mixture is acidified by the addition of 21.5 parts of 31.5% hydrochloric acid. Sufficient ice is added to reduce temperature to 0°–15° C. At this temperature, 20 parts of 5 N sodium nitrite solution is added during 15 minutes. The mixture is stirred for 15 minutes, and the excess nitrous acid decomposed by addition of a small amount of sulfamic acid. The diazonium salt suspension is added to a solution of coupling component obtained by dissolving 37.6 parts of N,N-di-(β-hydroxyethyl sulfuric acid ester)-3-chloroaniline in 200 parts of water. The pH of the mixture is adjusted to 6.0 by the addition of about 25 parts of sodium carbonate. The dyestuff is precipitated with potassium chloride, filtered with suction, dried, and ground. The yield is 85 parts by weight of a yellow powder, which dissolves in water to give golden yellow solution. Bright golden yellow shades are obtained from salt-containing dye liquors with the aid of alkalies on natural and regenerated cellulosic fibers.

The compound produced according to this example is of the structure designated in NO. 29 in Table 1.

EXAMPLE 5

2,5-Dimethoxy-4-(β-hydroxyethyl sulfone sulfuric acid)-aniline, 34.1 parts, is added to 200 parts of water. Mixture is acidified by the addition of 21.5 parts of 31.5% hydrochloric acid. Sufficient ice is added to reduce temperature to 0°–5° C. At this temperature, 20 parts of 5 N sodium nitrite solution is added during 15 minutes. The mixture is stirred for 15 minutes, and the excess nitrous acid decomposed by addition of a small amount of sulfamic acid. The diazonium salt solution is added to a solution of coupling component obtained by dissolving 35.7 parts of 5-acetamino-2-methoxy-N-cyanoethyl-N-(β-hydroxyethyl sulfuric acid ester)-aniline in 200 parts of water. The pH of the mixture is adjusted to 6.0 by the addition of about 16 parts of sodium carbonate. The dyestuff is precipitated with potassium chloride, filtered with suction, dried, and ground. The yield is 80 parts by weight of a red powder, which dissolves in water to give a red solution. Bright red shades are obtained from salt containing dye liquors with the aid of alkalies on natural and regenerated cellulosic fibers.

The compound produced according to this example is of the structure designated in NO. 32 in Table 1.

EXAMPLE 6

4-Methoxy-2-methyl-5-(β-hydroxyethyl sulfone sulfuric acid ester)-aniline, 32.5 parts, is added to 200 parts of water. Mixture is acidified by the addition of 21.5 parts of 31.5% hydrochloric. Sufficient ice is added to reduce temperature to 0°–5° C. At this temperature, 20 parts of 5 N sodium nitrite solution is added during 15 minutes. The mixture is stirred for 15 minutes, and the excess nitrous acid decomposed by addition of a small amount of sulfamic acid. The diazonium salt solution is added to a solution of coupling component obtained by dissolving 24.5 parts of N-(β-hydroxyethyl sulfuric acid ester)-N-ethylaniline in 200 parts of water. The pH of the mixture is adjusted to 6.0 by the addition of about 16 parts of sodium carbonate. The dyestuff is precipitated with potassium chloride, filtered with suction, dried, and ground. The yield is 85 parts by weight of a red-yellow powder, which dissolves in water to give a golden yellow solution. Bright golden yellow shades are obtained from salt containing dye liquors with the aid of alkalies on natural and regenerated cellulosic fibers.

The compound produced according to this example is of the structure designated in NO. 52 in Table 1.

EXAMPLE 7

20.1 Parts of a 4-β-hydroxyethylsulfonyl-aniline were introduced into a mixture of 30 parts of concentrated hydrochloric acid and 300 parts by volume of water, the mixture was cooled to 0° to 5° C. and diazotized at said temperature with 20 parts by volume of aqueous 5 N sodium nitrite solution. Stirring of the mixture was continued for 60 minutes and the excess of nitrous acid decomposed with amidosulfonic acid. For coupling a solution of 13.7 parts of N-β-hydroxyethyl-aniline in 30 parts by volume of glacial acetic acid was added, while the pH of the coupling mixture was adjusted to and maintained at 1.8 to 2.0 by the addition of sodium bicarbonate. The coupling mixture was stirred for some hours at 10° to 18° C., the precipitated dyestuff filtered off with suction, washed with a little 5% sodium sulfate solution and dried at 60° C.

The dry product was introduced into 250 parts of 100% sulfuric acid and the mixture was stirred for 4 hours at 60° to 70° C. After cooling, the esterification mixture was cautiously poured onto 1,400 parts of ice, the excess sulfuric acid was precipitated in the form of calcium sulfate by slowly adding 235 parts of calcium carbonate in portions, the hot reaction mixture was filtered off with suction and the precipitate washed with hot water. The dyestuff solution obtained as filtrate was spray-dried.

The dyestuff isolated in this manner yielded on cotton orange dyeings and prints under the fixing conditions known and usual for reactive dyes. In the form of the free acid the compound produced according to this example is of the structure designated in 41 Table 1.

The dyestuffs listed in Table 1, including those of Examples 1–7, were prepared according to the processes of the present invention. These dyestuffs yielded fast dyeings on cotton and prints in the shades indicated in the table.

TABLE 1

| No. | Structure | Color |
|---|---|---|
| (1) | $HO_3S-O-CH_2CH_2O_2S-\underset{CH_3}{\overset{OCH_3}{C_6H_2}}-N=N-C_6H_4-N(CH_2CH_3)(CH_2CH_2-O-SO_3H)$ | ORANGE |
| (2) | $HO_3S-O-CH_2CH_2O_2S-C_6H_4-N=N-C_6H_4-N(CH_2CH_3)(CH_2CH_2-O-SO_3H)$ | ORANGE |
| (3) | $HO_3S-O-CH_2CH_2O_2S-\underset{}{\overset{OCH_3}{C_6H_3}}-N=N-C_6H_4-N(CH_2CH_3)(CH_2CH_2-O-SO_3H)$ | ORANGE |
| (4) | $HO_3S-O-CH_2CH_2O_2S-C_6H_4-N=N-C_6H_4-N(CH_2CH_2-O-SO_3H)_2$ | ORANGE |
| (5) | $HO_3S-O-CH_2CH_2O_2S-\underset{OCH_3}{\overset{OCH_3}{C_6H_2}}-N=N-C_6H_4-N(CH_2CH_3)(CH_2CH_2-O-SO_3H)$ | SCARLET |
| (6) | $HO_3S-O-CH_2CH_2O_2S-C_6H_4-N=N-C_6H_4-N(CH_3)(CH_2CH_2-O-SO_3H)$ | ORANGE |
| (7) | $HO_3S-O-CH_2CH_2O_2S-\underset{OCH_3}{\overset{OCH_3}{C_6H_2}}-N=N-C_6H_4-N(CH_3)(CH_2CH_2-O-SO_3H)$ | SCARLET |
| (8) | $HO_3S-O-CH_2CH_2O_2S-\underset{OCH_3}{\overset{OCH_3}{C_6H_2}}-N=N-\underset{Cl}{C_6H_3}-N(CH_2CH_2-O-SO_3H)_2$ | SCARLET |
| (9) | $HO_3S-O-CH_2CH_2O_2S-C_6H_4-N=N-\underset{Cl}{C_6H_3}-N(CH_2CH_2-O-SO_3H)_2$ | ORANGE |
| (10) | $HO_3S-O-CH_2CH_2O_2S-\underset{CH_3}{\overset{OCH_3}{C_6H_2}}-N=N-\underset{Cl}{C_6H_3}-N(CH_2CH_2-O-SO_3H)_2$ | ORANGE |
| (11) | $HO_3S-O-CH_2CH_2O_2S-C_6H_4-N=N-\underset{OCH_3}{\overset{OCH_3}{C_6H_2}}-N(CH_2CH_2-O-SO_3H)_2$ | SCARLET |
| (12) | $HO_3S-O-CH_2CH_2O_2S-C_6H_4-N=N-\underset{CH_3}{C_6H_3}-N(CH_2CH_2-O-SO_3H)_2$ | ORANGE |
| (13) | $HO_3S-O-CH_2CH_2O_2S-\underset{CH_3}{\overset{OCH_3}{C_6H_2}}-N=N-\underset{CH_3}{C_6H_3}-N(CH_2CH_2-O-SO_3H)_2$ | ORANGE |
| (14) | $HO_3S-O-CH_2CH_2O_2S-\underset{OCH_3}{\overset{OCH_3}{C_6H_2}}-N=N-\underset{CH_3}{C_6H_3}-N(CH_2CH_2-O-SO_3H)_2$ | RED |
| (15) | $HO_3S-O-CH_2CH_2O_2S-\underset{OCH_3}{\overset{OCH_3}{C_6H_2}}-N=N-\underset{OCH_3}{\overset{OCH_3}{C_6H_2}}-N(CH_2CH_2-O-SO_3H)_2$ | RED |

TABLE 1-continued
| (16) | 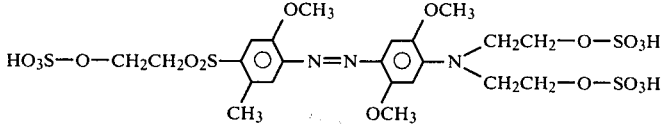 | RED |
|---|---|---|
| (17) | 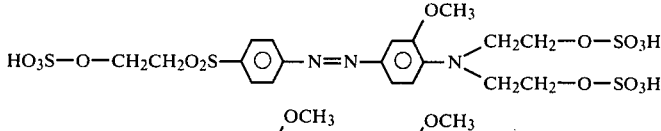 | ORANGE |
| (18) | 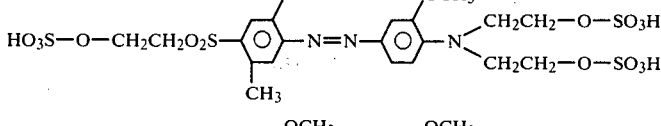 | ORANGE |
| (19) | 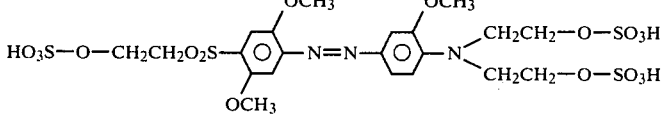 | ORANGE |
| (20) | 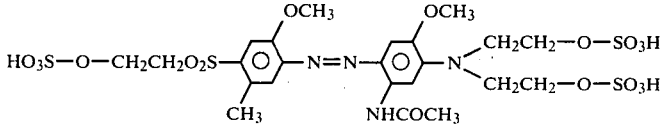 | RED |
| (21) | 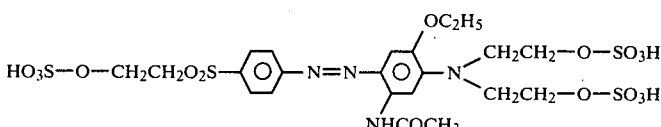 | RED |
| (22) | 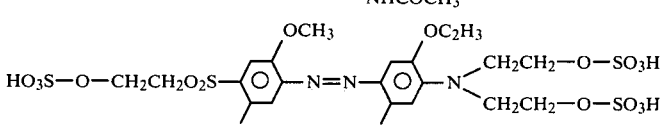 | RED |
| (23) | 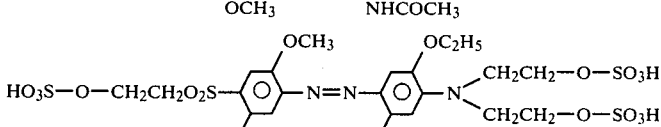 | RED |
| (24) | 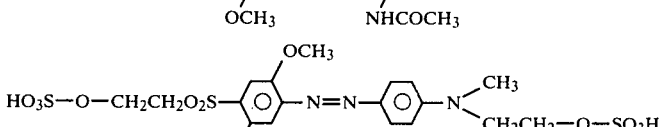 | ORANGE |
| (25) | 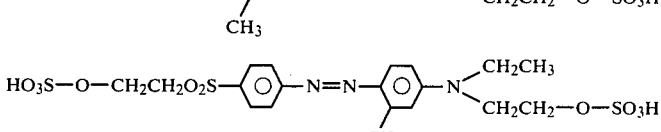 | ORANGE |
| (26) | 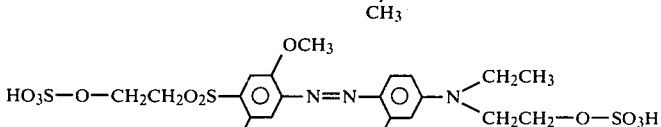 | ORANGE |
| (27) | 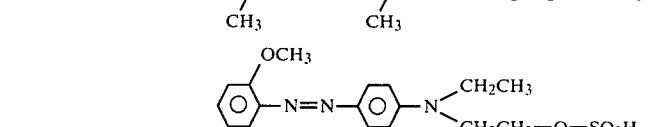 | ORANGE |
| (28) | 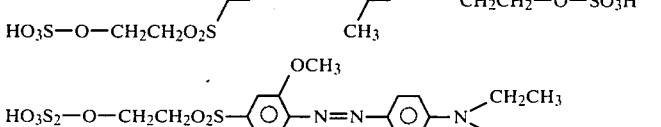 | ORANGE |

TABLE 1-continued

| (29) | HO₃S—O—CH₂CH₂O₂S—[benzene with OCH₃]—N=N—[benzene with Cl]—N(CH₂CH₂—O—SO₃H)₂ | GOLDEN YELLOW |
| --- | --- | --- |
| (30) | HO₃S—O—CH₂CH₂O₂S—[benzene with OCH₃]—N=N—[benzene with CH₃]—N(CH₂CH₂—O—SO₃H)₂ | ORANGE |
| (31) | HO₃S—O—CH₂CH₂O₂S—[benzene]—N=N—[benzene with OCH₃ and NHCOCH₃]—N(CH₂CH₂CN)(CH₂CH₂—O—SO₃H) | RED |
| (32) | HO₃S—O—CH₂CH₂O₂S—[benzene with OCH₃, OCH₃]—N=N—[benzene with OCH₃ and NHCOCH₃]—N(CH₂CH₂CN)(CH₂CH₂—O—SO₃H) | RED |
| (33) | HO₃S—O—CH₂CH₂O₂S—[benzene with OCH₃, CH₃]—N=N—[benzene with OCH₃ and NHCOCH₃]—N(CH₂CH₂CN)(CH₂CH₂—O—SO₃H) | RED |
| (34) | HO₃S—O—CH₂CH₂O₂S—[benzene with OCH₃]—N=N—[benzene with OC₂H₅ and NHCOCH₃]—N(CH₂CH₂CN)(CH₂CH₂—O—SO₃H) | RED |
| (35) | HO₃S—O—CH₂CH₂O₂S—[benzene with CH₃, CH₃]—N=N—[benzene]—N(CH₂CH₃)(CH₂CH₂—O—SO₃H) | ORANGE |
| (36) | CH₃—[benzene with CH₃; HO₃S—O—CH₂CH₂O₂S]—N=N—[benzene]—N(CH₂CH₃)(CH₂CH₂—O—SO₃H) | ORANGE |
| (37) | HO₃S—O—CH₂CH₂O₂S—[benzene with CH₃, CH₃]—N=N—[benzene with Cl]—N(CH₂CH₂—O—SO₃H)₂ | ORANGE |
| (38) | CH₃—[benzene with CH₃; HO₃S—O—CH₂CH₂O₂S]—N=N—[benzene with Cl]—N(CH₂CH₂—O—SO₃H)₂ | ORANGE |
| (39) | CH₃O—[benzene with OCH₃; HO₃S—O—CH₂CH₂O₂S]—N=N—[benzene]—N(CH₂CH₃)(CH₂CH₂—O—SO₃H) | ORANGE |
| (40) | CH₃O—[benzene with OCH₃; HO₃S—O—CH₂CH₂O₂S]—N=N—[benzene with Cl]—N(CH₂CH₂—O—SO₃H)₂ | ORANGE |
| (41) | HO₃S—O—CH₂CH₂O₂S—[benzene]—N=N—[benzene]—NHCH₂CH₂O—SO₃H | ORANGE |

TABLE 1-continued

| (42) | HO₃S—O—CH₂CH₂O₂S—⌬(OCH₃)(CH₃)—N=N—⌬—NHCH₂CH₂—O—SO₃H | ORANGE |
|---|---|---|
| (43) | HO₃S—O—CH₂CH₂O₂S—⌬(OCH₃)(OCH₃)—N=N—⌬—NHCH₂CH₂—O—SO₃H | ORANGE |
| (44) | HO₃S—O—CH₂CH₂O₂S—⌬(OCH₃)—N=N—⌬—NHCH₂CH₂—O—SO₃H | GOLDEN YELLOW |
| (45) | HO₃S—O—CH₂CH₂O₂S—⌬—N=N—⌬(CH₃)—NHCH₂CH₂—O—SO₃H | ORANGE |
| (46) | HO₃S—O—CH₂CH₂O₂S—⌬(OCH₃)(CH₃)—N=N—⌬(CH₃)—NHCH₂CH₂O—SO₃H | ORANGE |
| (47) | HO₃S—O—CH₂CH₂O₂S—⌬(OCH₃)(OCH₃)—N=N—⌬(CH₃)—NHCH₂CH₂O—SO₃H | ORANGE |
| (48) | HO₃S—O—CH₂CH₂O₂S—⌬(OCH₃)—N=N—⌬(CH₃)—NHCH₂CH₂O—SO₃H | GOLDEN YELLOW |
| (49) | H₃CO—⌬(HO₃S—O—CH₂CH₂O₂S)—N=N—⌬—N(CH₂CH₃)(CH₂—CH₂—O—SO₃H) | ORANGE |
| (50) | H₃CO—⌬(HO₃S—O—CH₂CH₂O₂S)—N=N—⌬(Cl)—N(CH₂CH₂—O—SO₃H)(CH₂—CH₂—O—SO₃H) | YELLOW |
| (51) | H₃CO—⌬(CH₃)(HO₃S—O—CH₂CH₂O₂S)—N=N—⌬(Cl)—N(CH₂—CH₂—O—SO₃H)(CH₂CH₂—O—SO₃H) | ORANGE |
| (52) | H₃CO—⌬(CH₃)(HO₃S—O—CH₂CH₂O₂S)—N=N—⌬—N(CH₂CH₃)(CH₂—CH₂—O—SO₃H) | ORANGE |

What is claimed is:

1. A process for coloring a fiber material selected from the group consisting of cellulose, natural or synthetic polyamides and mixtures thereof, comprising applying to said fiber material a water soluble dyestuff which, in the form of the free acid, has the formula:

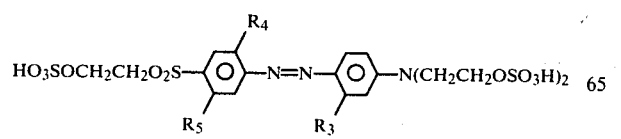

wherein $R_3$ is halogen and $R_4$ and $R_5$ are each independently selected from hydrogen, methyl, ethyl, methoxy, and ethoxy, and fixing said dyestuff on said fiber material by the action of an alkaline agent.

2. The process of claim 1 wherein $R_4$ and $R_5$ are both hydrogen.

3. The process of claim 2 wherein $R_3$ is chloro.

4. The process of claim 1 wherein said dyestuff is further fixed on said fiber material by the application of heat.

5. The process of claim 1 wherein said dyestuff is further fixed on said fiber material by the application of steam.

* * * * *